United States Patent
Skinner et al.

(10) Patent No.: US 11,671,388 B1
(45) Date of Patent: Jun. 6, 2023

(54) CONTACT CENTER MESSAGING

(71) Applicant: State Farm Mutual Automobile Insurance Company, Bloomington, IL (US)

(72) Inventors: Chad Skinner, Talladega, AL (US); Scott D. Dies, Eureka, IL (US); Amit Gupta, Normal, IL (US); Aaron Kammeyer, Clinton, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/378,204

(22) Filed: Jul. 16, 2021

Related U.S. Application Data

(60) Provisional application No. 63/052,773, filed on Jul. 16, 2020.

(51) Int. Cl.
*H04L 51/06* (2022.01)
*G06N 20/00* (2019.01)
*G06F 9/54* (2006.01)
*H04L 51/222* (2022.01)
*H04L 67/1001* (2022.01)

(52) U.S. Cl.
CPC ............. *H04L 51/06* (2013.01); *G06F 9/542* (2013.01); *G06N 20/00* (2019.01); *H04L 51/222* (2022.05); *H04L 67/1001* (2022.05)

(58) Field of Classification Search
None
See application file for complete search history.

(56) References Cited

U.S. PATENT DOCUMENTS

| | | |
|---|---|---|
| 6,243,763 B1 | 6/2001 | Brodsky et al. |
| 6,263,066 B1 | 7/2001 | Shtivelman et al. |
| 6,621,895 B1 | 9/2003 | Giese |
| 6,771,766 B1 | 8/2004 | Shafiee et al. |
| 6,775,377 B2 | 8/2004 | McIllwaine et al. |
| 6,904,143 B1 | 6/2005 | Peterson et al. |
| 7,072,966 B1 | 7/2006 | Benjamin et al. |
| 7,092,509 B1 | 8/2006 | Mears et al. |
| 7,233,980 B1 | 6/2007 | Holden et al. |
| 7,315,616 B2 | 1/2008 | Annadata et al. |

(Continued)

FOREIGN PATENT DOCUMENTS

EP       1163564       12/2001

OTHER PUBLICATIONS

E. Bozdag, A. Mesbah and A. van Deursen, "A Comparison of Push and Pull Techniques for AJAX," 2007 9th IEEE International Workshop on Web Site Evolution, 2007, pp. 15-22, doi: 10.1109/WSE.2007.4380239. (Year: 2007).*

*Primary Examiner* — Jonathan A Bui
(74) *Attorney, Agent, or Firm* — Lee & Hayes, P.C.

(57) ABSTRACT

Techniques described herein relate to message distribution in a contact center. Messages generated by an administrator and/or by a trained model processing data from customer interactions with the contact center are stored in a message queue. A desktop application running on a representative device and hosted by the contact center queries the message queue for messages intended for a representative using the representative device. Messages intended for the representative are automatically displayed on the representative device, e.g., on the desktop.

20 Claims, 7 Drawing Sheets

(56) References Cited

U.S. PATENT DOCUMENTS

| | | |
|---|---|---|
| 7,353,253 B1 | 4/2008 | Zhao |
| 7,505,577 B2 | 3/2009 | Annadata et al. |
| 7,730,204 B2 | 6/2010 | Pak |
| 7,788,679 B2 | 8/2010 | Chen et al. |
| 7,805,487 B1 | 9/2010 | Isaacs et al. |
| 7,922,493 B1 | 4/2011 | Gennaro et al. |
| 7,965,995 B2 | 6/2011 | Spector |
| 8,001,186 B2 | 8/2011 | Kordun |
| 8,112,391 B2 | 2/2012 | Allen et al. |
| 8,271,618 B1 | 9/2012 | Kridlo |
| 8,379,832 B1 | 2/2013 | Lyman |
| 8,396,205 B1 | 3/2013 | Lowry et al. |
| 8,806,024 B1 | 8/2014 | Toba Francis et al. |
| 9,077,804 B2 | 7/2015 | Kannan et al. |
| 9,106,736 B1 | 8/2015 | Slovacek |
| 9,172,806 B2 | 10/2015 | Tuchman et al. |
| RE45,959 E | 3/2016 | McCord et al. |
| 9,338,121 B2 | 5/2016 | Ciancio-Bunch |
| 9,356,896 B2 | 5/2016 | Jesse et al. |
| 9,515,976 B2 | 12/2016 | Talwar et al. |
| 9,521,259 B2 | 12/2016 | Davis et al. |
| 9,569,751 B2 | 2/2017 | Steiner et al. |
| 9,807,040 B2 | 10/2017 | Mendiola et al. |
| 9,826,095 B2 | 11/2017 | D'Arcy et al. |
| 9,843,681 B2 | 12/2017 | Tuchman et al. |
| 9,930,179 B2 | 3/2018 | Steiner et al. |
| 9,984,061 B2 | 5/2018 | Isensee et al. |
| 10,275,448 B2 | 4/2019 | Isensee et al. |
| 10,320,971 B2 | 6/2019 | Ghuli et al. |
| 10,346,785 B2 | 7/2019 | Tamblyn et al. |
| 10,601,991 B1 | 3/2020 | Braddick |
| 10,601,992 B2 | 3/2020 | Dwyer et al. |
| 10,671,337 B2 | 6/2020 | Khalatian et al. |
| 10,671,977 B2 | 6/2020 | Caldwell et al. |
| 10,693,923 B2 | 6/2020 | Abiezzi |
| 10,694,040 B1 | 6/2020 | Jiron et al. |
| 10,997,557 B2 | 5/2021 | Frank et al. |
| 11,423,448 B2 | 8/2022 | Udupa et al. |
| 2003/0033369 A1* | 2/2003 | Bernhard ............... H04L 29/06 709/203 |
| 2003/0078985 A1* | 4/2003 | Holbrook ............... H04L 51/38 709/213 |
| 2003/0097361 A1 | 5/2003 | Huang et al. |
| 2004/0024794 A1* | 2/2004 | Jain ..................... G06F 11/1474 |
| 2004/0243617 A1* | 12/2004 | Bayyapu ............... H04L 67/62 707/999.102 |
| 2005/0053018 A1* | 3/2005 | Hoppe-Boeken ....... H04L 51/04 370/260 |
| 2006/0256954 A1 | 11/2006 | Patel et al. |
| 2007/0198284 A1 | 8/2007 | Korenblit et al. |
| 2007/0203797 A1 | 8/2007 | Annadata et al. |
| 2008/0240404 A1 | 10/2008 | Conway et al. |
| 2009/0035736 A1 | 2/2009 | Wolpert et al. |
| 2011/0223574 A1 | 9/2011 | Crawford et al. |
| 2012/0030298 A1 | 2/2012 | Bells et al. |
| 2013/0039483 A1 | 2/2013 | Wolfeld et al. |
| 2013/0086153 A1* | 4/2013 | Vendrow ................ H04L 51/36 709/203 |
| 2013/0176413 A1 | 7/2013 | Lowry et al. |
| 2013/0218922 A1* | 8/2013 | DeLuca ................ H04L 51/22 707/769 |
| 2015/0180845 A1* | 6/2015 | Uomini .................. H04L 51/12 726/3 |
| 2018/0083898 A1* | 3/2018 | Pham .................... H04L 51/02 |
| 2020/0099790 A1 | 3/2020 | Ma et al. |
| 2020/0111377 A1 | 4/2020 | Truong et al. |
| 2020/0364724 A1 | 11/2020 | Pulugurtha et al. |
| 2020/0394590 A1 | 12/2020 | Kaimal et al. |
| 2022/0086279 A1 | 3/2022 | Skinner et al. |
| 2022/0182492 A1 | 6/2022 | Skinner et al. |

\* cited by examiner

CONTACT CENTER MESSAGING

RELATED APPLICATIONS

This patent application claims priority to U.S. Provisional Patent Application No. 63/052,773, filed Jul. 16, 2020, and entitled "Contact Center Messaging," the entirety of which is hereby incorporated by reference.

BACKGROUND

Large organizations often use automated contact centers to handle interactions between employees or representatives of the organization and customers or other parties. Different types of organizations, including businesses, government agencies, and educational institutions may use automated contact centers for sales, customer service, technical and software support, problem resolution, or the like. Automated contact centers may be small or large-scale, depending on the amount of customer traffic and the structure of the organization. Large-scale contact centers, for example, may include representatives in different roles and/or different departments, using client systems that are distributed across different data centers, geographic locations, and/or networks. In some cases, a customer call or other contact (e.g., video or chat session) into the contact center may be answered first by an automated computer system which requests a series of inputs from the customer to determine where the contact is to be routed.

The various hardware, network, and software components of a contact center may connect and support interactive media sessions between customers and organization representatives, each working independently on the separate computing devices. The contact center also may support transferring customer interaction sessions to different representatives, multi-party interactive sessions, interactions between organization representatives and administrators, etc. Different combinations of interactive session types and/or media types are supported by various contact centers, such as voice sessions (e.g., telephony-based), video chat sessions, email communications, social media-based sessions, etc. Certain contact centers also may use software-based queuing and routing techniques to connect specific customers with specific representatives based on characteristics and criteria such as the purpose of the customer contact, the session/media type, geographic location, language, representative qualifications and certifications, etc.

Because contact centers may be distributed geographically, may support multiple interactive session types and/or media types, and may be used for multiple purposes, coordinating representatives, e.g., by distributing information to those representatives, is often difficult. Conventionally, an administrator desiring to distribute information will compose and send a message in a specific messaging application, e.g., an e-mail or instant messaging app. The recipient(s) of the message will receive the message only if he/she is running, e.g., logged into, the messaging application and/or is actively checking for new messages. However, representatives accessing the contact center may be using specific (and disparate) applications to interact with different types of customers. Separate messaging applications may be confusing and/or detract from assisting customers, and thus often go ignored for long stretches and/or are entirely unused. Accordingly, there is a need in the art for an improved messaging system within contact center environments.

SUMMARY

To address problems and inefficiencies associated with automated contact centers, this disclosure describes various systems and techniques for transmitting or broadcasting messages. In some examples, a thick client framework may include a desktop application via which client devices access containerized application images for interacting with customers. Aspects of this disclosure include displaying messages via the desktop application, e.g., instead of via a separate messaging application. Accordingly, important information can be presented to representatives regardless of the tasks they are performing, application they are running, or the like. In some examples, the framework can generate an administrator interface via which messages can be composed and/or selected for distribution and via which message recipients may be identified. Also in examples, messages may be generated automatically, e.g., using a trained model, in response to the occurrence of one or more events. The framework may also facilitate queuing messages for subsequent retrieval by and/or broadcasting to intended recipients, e.g., for display on a desktop of display devices associated with thick clients. Because messages are presented on the desktop, they may be visible at the client regardless of other tasks performed by the representative and without the representative accessing and/or monitoring a separate messaging application.

In an example of the present disclosure, an example contact center server, includes one or more processors; and one or more non-transitory computer-readable media storing computer-executable instructions that, when executed, cause the one or more processors to perform operations including: hosting, at the contact center server, a desktop application and a plurality of containerized applications for interacting with customers; maintaining, at the contact center server, a message queue; receiving message information associated with a generated message for distribution to one or more recipients; updating the message queue to include the generated message and an identification of the one or more recipients; receiving, from a thick client device, a request for new messages, the thick client device running the desktop application and a containerized application of the plurality of containerized applications; determining that the thick client device is associated with a recipient of the one or more recipients; and causing the generated message to be displayed, via the desktop application, on a display of the thick client device.

In another example of the present disclosure, an example method includes hosting a desktop application and a plurality of containerized applications for interacting with customers; receiving message information associated with a generated message for distribution to one or more recipients; updating a message queue to include the generated message and an identification of the one or more recipients; receiving, from a thick client device running the desktop application and a containerized application of the plurality of containerized applications, a request for messages; determining that the thick client device is associated with a recipient of the one or more recipients; and causing the generated message to be displayed, via the desktop application, on a display of the thick client device.

In yet another example of the present disclosure, one or more example non-transitory computer-readable media storing instructions that, when executed by one or more processors, cause the one or more processors to perform actions including: receiving information associated with a generated message for distribution to one or more recipients; updating a message queue to include the generated message and an identification of the one or more recipients; receiving, from a thick client device running the desktop application and a containerized application of the plurality of containerized applications, a request for messages; determining that the thick client device is associated with a recipient of the one or more recipients; and causing the generated message to be displayed, via the desktop application, on a display of the thick client device.

DETAILED DESCRIPTION

Figure 1:
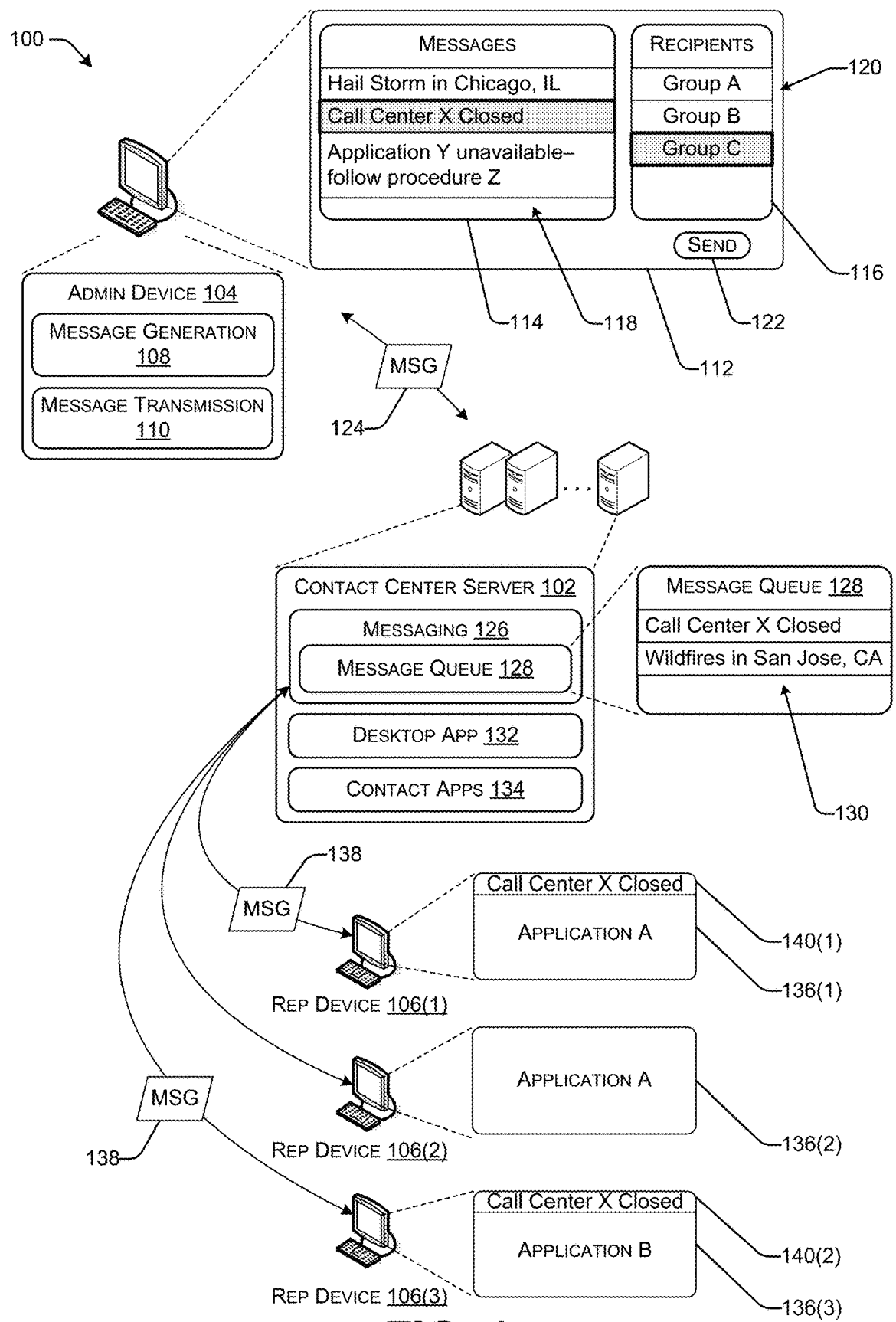
FIG. 1 is a schematic illustration of a computing environment associated with an automated contact center and illustrates an example of message generation and distribution, in accordance with one or more examples of the present disclosure.

FIG. 1 illustrates an example of transmitting messages in an environment 100 according to aspects of this disclosure. For instance, the environment 100 may schematically represent aspects of a contact center such as a business- or enterprise-wide contact center configured to accept, route, and dispose of customer inquiries. As illustrated in more detail in FIG. 1, the environment 100 includes a contact center server 102 in communication with each of an administrator device 104, a first representative device 106(1), a second representative device 106(2), and a third representative device 106(3). Herein, the first representative device 106(1), the second representative device 106(2), and the third representative device 106(3), as well as other representative devices not illustrated, may be referred to as the representative devices 106. Although FIG. 1 illustrates only a single administrator device 104 and the three representative devices 106, this is for example only. In some implementations, the environment 100 can include up to and including thousands of representative devices and/or administrative devices.

In the example of FIG. 1, an administrator or other user interfacing with the administrator device 104 generates or selects messages for distribution to one or more of the representative devices 106. Specifically, the administrator device 104 may include or otherwise access a message generation component 108 and a message transmission component 110, as detailed further herein.

The administrator device 104 may implement the message generation component 108 to open or otherwise access a message generation user interface 112. For instance, the administrator device 104 may render the message generation user interface 112 on a display of the administrator device 104. As illustrated in FIG. 1, the message generation user interface 112 can include a message window 114 and a recipient window 116, among other features. As illustrated, the message window 114 can include one or more messages 118, shown as textual messages in FIG. 1. For instance, the messages 118 shown in FIG. 1 are "Hail Storm in Chicago, Ill.," "Call Center X Closed," and "Application Y unavailable-follow procedure Z." Of course, the messages 118 illustrated are for example only. In the illustrated embodiment, the message window 114 includes the messages 118 as a list of pre-generated messages. For instance, the messages 118 may be messages previously generated by the administrator logged into or otherwise using the administrator device. In other examples, the messages 118 may include messages generated by other administrators, by other administrator devices, and/or otherwise generated. As detailed further herein, and particularly with reference to FIG. 3, the messages 118 may include messages generated by a machine learned model or other computer-implemented process. Although the message window 114 is illustrated as presenting the messages 118 as a list, the message window 114 may be otherwise arranged. Moreover, the message window 114 may include additional functionality, such as for searching, filtering, or otherwise identifying pre-generated messages. Moreover, and although not illustrated in FIG. 1, the message window 114 may also or alternatively include data entry functionality, such as a text box or similar interface, via which a user of the administrator device 104 may compose a new message.

The recipient window 116 includes one or more recipients 120. In the illustrated example, individual of the recipients 120 are groups, specifically, "Group A," "Group B," and "Group C." For instance, each of the groups may include a number of individual recipients sharing one or more common characteristics. For example, individual of the groups may be based on a function within an organization, a status within the organization, a geographic location, or the like. Alternatively, the recipients 120 may include individual recipients, e.g., individual people. The recipients 120 are not limited to those illustrated in FIG. 1. In some example, the recipients window 116 may show most recently contacted recipients, favorite recipients, e.g., designated by an administrator accessing the administrator device 104, or otherwise. Although not illustrated in FIG. 1, the recipient window 116 may include additional functionality for identifying recipients. For instance, the recipient window may include search, filtering, and/or other functionality for identifying recipients. Although the message window 114 and the recipient window 116 are referred to herein as a "window," the functionality of the message window 114, e.g., for selecting and/or generating messages for distribution to recipients, and of the recipient window 116, e.g., for selecting and/or identifying recipients to receive messages, are not limited implementation via any specific graphic, layout, or other construct. In examples, the recipients can include all recipients within an organization and/or some subset of all recipients, e.g., without a limit to the number.

In operation, an administrator accessing the administrator device 104 desiring to send a message may interact with the message generation user interface 112 by selecting a message from the messages 118 in the message window 114 and a recipient from the recipients 120 in the recipient window 116. In the example illustrated, the message "call Center X closed" is visually offset relative to other of the messages 118, indicating that the administrator using the administrator device 104 has selected this message. Similarly, "Group C" is offset relative to other of the recipients 120, indicating that the administrator using the administrator device 104 intends to send the selected message to this group of recipients. In examples, the administrator can select the message and the recipient(s) using conventional user interface tools, including but not limited to, a touch screen, a mouse, a keyboard, a stylus, or the like. The message generation user interface 112 also includes a user interface element 122, labelled "send" in the example. Selection of the "send" user interface element 122 may cause the "call center X closed" message to be sent to the "Group C" recipients, as described herein.

In some examples, in response to a user selecting the user interface element 122, the message transmission component 110 of the administrator device 104 can generate message information 124 comprising information indicative of and/or associated with the selected message and/or information indicative of and/or associated with the recipients. The message transmission component 110 can generate one or more of a file, a packet, and/or other data structure(s) to embody the message information 124. Moreover, the message transmission component 110 can send the message information 124 to the contact center server 102, e.g., for distribution to the intended recipients, as described further herein.

As illustrated in FIG. 1, the message information 124 may be received at the contact center server 102. For instance, the contact center server 102 includes a messaging component 126 that receives the message information 124. In more detail, the messaging component 126 includes functionality to generate and/or maintain a message queue 128. A visualization of the message queue 128 is provided in FIG. 1, and includes two messages 130, e.g., "Call Center X Closed" and "Wildfires in San Jose, Calif." The first message, "Call Center X Closed," corresponds to the message generated at and received from the administrator device 104. The second message, "Wildfires in San Jose, Calif.," may also be generated at and/or received from the administrator device 104. In other instances, the second message can be received from a different administrator device associated with the environment 100, from a machine-learned model (as detailed further herein), and/or from some other source.

Although the visualization of the message queue 128 shows only text associated with messages contained therein, the message queue 128 and/or the messaging component 126 also stores additional data associated with the message information 124. For example, the messaging component 126 stores or causes to be stored recipient information association with the messages, e.g., as identifiers of users or groups of users who are to receive the various messages. In examples, the contact center server 102, e.g., via the messaging component 126, can store associations of users with groups of users. Additional data associated with the message queue 128 can include time information. By way of non-limiting example, messages in the message queue 128 can have an associated duration, e.g., a length of time for which the message is to remain in the message queue 128. Although not illustrated in FIG. 1, an administrator can identify a duration for which a message is to last via the message generation user interface 112.

As also illustrated in FIG. 1, the contact center server 102 hosts a desktop application 132 and a plurality of contact applications 134. As detailed further herein, a contact center implementing the contact center server 102 may provide a centralized hub or software architecture for many diverse segments of a business or organization. That is, the contact center server 102 may host a number of different applications accessible by administrators, e.g., via the administrator device 104, by representatives, e.g., via the representative devices 106, and by customers (not shown in FIG. 1). The contact center may have an overarching framework, embodied at least in part in the desktop application 132. In some examples, aspects of the desktop application 132 may be accessed by the representative devices 106 to access all other applications, including the contact applications 134. In other examples, the desktop application 132 may be at least partially stored on the administrator device 104 and/or the representative devices 106.

The contact applications 134 are applications accessed and used by the representative devices 106. As detailed further herein, the representative devices 106 can be thick client devices that access the contact applications 134 and/or download an instance of the contact applications 134 to perform actions associated with the contact center server. In some examples, the contact applications 134 may be containerized applications accessible via images maintained at the contact center server 102. The contact applications 134 are run, e.g., by receiving, unpacking, execution, on the individual representative devices 106 to perform contact-related services. In some instances, the contact applications 134 are third-party software applications that facilitate one or more specific contact interactions. For instance, a first of the contact applications 134 may allow a representative using one of the representative devices 106 to have a text-based conversation with a customer accessing the contact center via a "chat" function, e.g., available on a website or application. A second of the contact applications 134 may allow a representative using one of the representative devices 106 to have a voice-based conversation with a customer accessing the contact center server 102, e.g., via a phone or other speech-based interface.

Techniques including using containerized application images as the contact application 134 may improve the functioning the contact center environment 100 by providing applications (or sub-processes therein) that are device specific and/or user specific to client devices, such as the administrator device 104 and/or the representative devices 106. Additional technical advantages of such features within contact center environments may result from more efficient and streamlined software updates and modifications. For instance, when an organization is required to modify or reconfigure a thick client application, if the thick client application is installed on each separate client device then a software update or patch may be transmitted to all client devices associated with the contact center. These decentralized software updates may be uncoordinated, unreliable, and inefficient. In contrast, distributing containerized application images from a repository stored in the contact center server 102 of the contact center may improve performance and distribution of software updates within the contact center.

The representative devices 106 run instances of the desktop application 132. For instance, the desktop application 132 may be run on each of the representative devices 106 upon a representative logging into the representative devices 106. The representative devices 106 also run instances of the contact applications 134. For instance, FIG. 1 illustrates a first user interface associated with the first representative device 106 (1), a second user interface 136 (2) associated with the second representative device 106 (2), and a third user interface 136 (3) associated with the representative device 106 (3). The first user interface 136 (1), the second user interface 136 (2), and the third user interface 136 (3) may be referred to collectively as the user interfaces 136. In implementations, the user interfaces 136 are substantially the same across each of the representative devices 106. For instance, each of the user interfaces 136 may provide similar functionality, including functionality to access and/or launch one or more of the contact applications 134. As illustrated, the first user interface 136 (1) includes an instance of an "Application A," the second user interface 136 (2) includes a second instance of the "Application A," and the third user interface 136 (3) includes an instance of a different "Application B." As will be appreciated, the "Application A" and the "Application B" are examples of the contact applications 134.

In addition to facilitating access to applications including the contact applications 134, the desktop application 132 provides additional functionality. Specifically, the desktop application, in conjunction with other aspects of the contact center server 102, facilitates messaging functionality, as described herein. More specifically, via the desktop application hosted by the contact center server 102, the individual representative devices 106 may query the contact center server 102 for messages. In examples, the representative devices 106 may send queries automatically, e.g., at predetermined times. Without limitation, the representative devices may query the contact center server 102 for messages upon a representative logging into the desktop application 132, according to a predetermined frequency, in response to certain actions being performed, and/or at other times. In response to a query sent by one of the representative devices 106, the contact center server 102, e.g. the messaging component 126 of the contact center server 102, may determine whether any of the messages 130 in the message queue 128 are intended for the representative device sending the query. In the example illustrated in FIG. 1, the contact center server 102 may determine whether one of the representative devices 106 sending the query is associated with one of the users in "Group C," and thus should receive the message "Call Center X Closed."

In response to determining that a representative device requesting messages is associated with one or more recipients of one of the messages 130 in the message queue 128, the contact center server 102, e.g., using the messaging component 126, sends message information 138 to the recipient device. In the example of FIG. 1, the first representative device 106(1), after querying the contact center server 102 for messages, receives the message information 138. The third representative device 106(3), after querying the contact center server 102 for messages, also receives the message information 138. The first representative device 106(1) and the third representative device 106(3) receive the message information 138, because those devices, and/or the users of those devices, are associated with the "Group C." For instance, "Group C" may include devices in a geographic area and the first representative device 106(1) and the third representative device 106(3) may be located in that geographic area. Alternatively, "Group C" may include specific users, and the users logged into the desktop application 132 running on the first representative device 106(1) and on the third representative devices 106(3) are associated with Group C in this example. As will be appreciated, the second representative device 106(2) also queries the contact center server 102, but the contact center server 102 determines that the second representative device 106 (2) should not receive the message information 138, e.g., because the second representative device 106(2) is not associated with "Group C."

As also illustrated in FIG. 1, the message information 138 received in each of the first representative device 106 (1) and the third representative device 106 (3) causes the message to be displayed in a portion of the respective graphical user interface 136. Specifically, a portion 140 (1) of the first graphical user interface 136 (1) of the first representative device 106 (1) and a portion 140 (2) of the third graphical user interface 136 (3) associated with the third representative device 106 (3) display the text "Call Center X Closed." The portion 140 (1) and the portion 140 (2) (collectively, "the portions 140") are for example only, as the message may be displayed anywhere on a display of the appropriate representative devices 106. In some examples, the portions 140 may represent a banner, a window, or the like. Moreover, the portions 140 may display the message using different graphical mechanisms, including but not limited to scrolling text, flashing text, or the like.

As will be appreciated, according to aspects of this disclosure, messages can be routed from an administrator e.g., operating an administrator device 104 to representatives, e.g., operating the representative devices 106. Such messages may be displayed directly on the display of the appropriate representative devices 106 without any affirmative action by the representative operating the representative devices 106. For instance, messages generated at the administrator device 104 can be displayed directly on the representative devices 106 without the need for opening or even installing a messaging application on the representative devices 106. In conventional contact center environments, messages are received via a special messaging application, and representatives only receive messages when they are the messaging application is open on the device being used by the representative, and only when the representative is actively looking for messages. In contrast, the present disclosure provides a means for providing important information to representatives regardless of the application(s) running on the representative device. As illustrated in FIG. 1, both the first representative device 106 (1) and the second representative device 106 (2) are using the same contact application, that is, "Application A," whereas the third representative device 106 (3) is using a different contact application, that is, "Application B."

Figure 2:
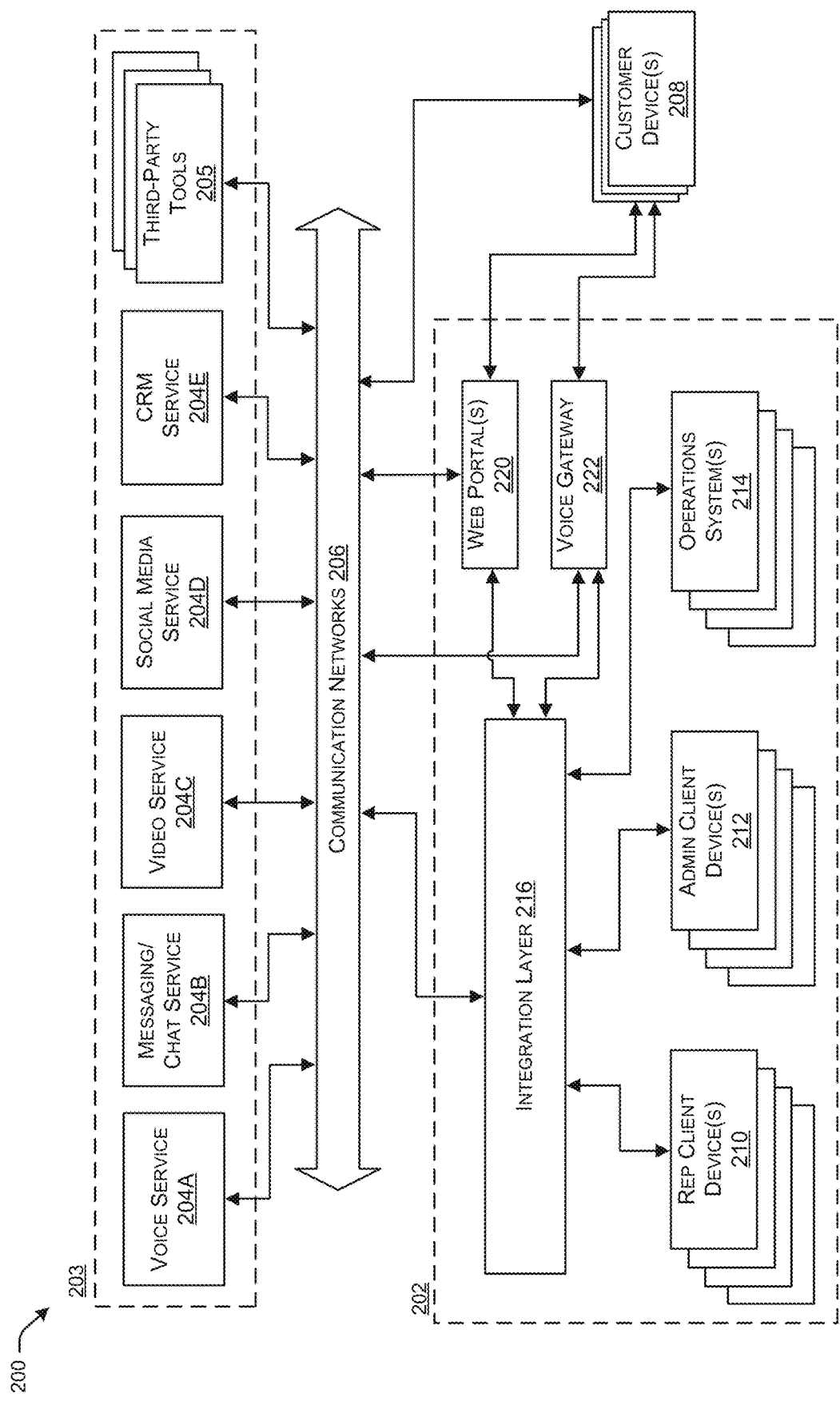
FIG. 2 illustrates a computing environment associated with an automated contact center, including various internal and external computer systems, services, and user devices, in accordance with one or more examples of the present disclosure.

FIG. 2 illustrates an example computing environment associated with a contact center 200. The contact center 200 may be, or may include, the contact center server 202 for implementing novel message distribution, as detailed herein. Contact centers described herein, including the contact center server 202 and/or the contact center 200 may include fully automated and/or semi-automated contact center environments. In this example, dotted box 202 identifies the internal components of the contact center 200, and components outside the dotted box 202 represent external components associated with the contact center. As used herein, an internal component of a contact center may refer to a component (e.g., computer server or device, network component, software service, application, etc.) that is controlled by the organization operating the contact center. In contrast, an external component of the contact center may refer to a component that interacts with at least one internal component of the contact center, but which is not controlled by the organization operating the contact center. As shown in this example, the external components associated with the contact center may include a number of external communication services 204A-204E (collectively "services 204") and/or tools 205 which may be provided by third-party service providers. Additional external components may include communication network(s) 206 and one or more customer devices 208 that communicate in interactive sessions with representatives (e.g., employees, contract workers, etc.) of the organization.

In some implementations, the internal components of the contact center may reside within a single server, e.g., the contact center server 102, and/or single data center operating at one geographic location. In such cases, some or all of the internal components of the contact center 200 may communicate via a secure private network such as a private LAN or secure corporate network protected by a firewall. In other implementations, the internal components may be distributed across multiple servers and/or multiple data centers that operate at different geographic locations. Internal components that are distributed across data centers may communicate via secure private networks and/or via unsecure public networks (e.g., the Internet) and may use tunneling and encryption technologies. As illustrated, the internal and external components of the contact center may communicate via communication networks 206, including but not limited to computer networks (e.g., TCP/IP networks, etc.), wireless networks (e.g., Long-Term Evolution (LTE), 5G, a Universal Mobile Telecommunications Service (UMTS), Global System for Mobile communications (GSM) networks, etc.), satellite networks, and the like.

In operation, the contact center 200 may be implemented via the computing environment shown in FIG. 2 to provide interactive communication sessions (or interactive sessions) between customers using the customer devices 208, and representatives of the organization using representative client devices 210 ("client devices 210"). The customer device(s) 208 and/or the representative client device(s) 210 may be any personal computing devices, such as desktop or laptop computers, mobile devices (e.g., smartphones, tablet computers, etc.), wearable computing devices, or any other device capable of communicating over the communication network(s) 206. In some scenarios, a customer, client, or other individual associated with the organization may use the customer device(s) 208 to contact the organization via a point-of-contact service, such as web portal(s) 220 or a voice gateway 222. In some examples, the contact center 200 may support different services for different communication types, such as the web portal 220 that processes web chat requests received via the web site of the organization, the voice gateway 222 that processes calls received via a telephone network and/or Voice over IP (VOIP) calls. Although two customer portals/gateways into the contact center 200 are shown in this example, any number of additional customer portals/gateways may be used in other implementations, such as portals or gateway services for voice communications from the customer device(s) 208, video communications, messaging/chat communications, social-media based communications, customer relationship management (CRM) based communications, or the like.

After one of the customer device(s) 208 initiates communication with the contact center, or vice versa, the contact center components may assign the customer to a representative and initiate an interactive session between the customer device 208 and one of the representative client device(s) 210, e.g., associated with the assigned representative. Interactive sessions may include voice sessions, video sessions, messaging/web chat sessions, social media sessions, and/or CRM sessions, etc. As shown in this example, the contact center 200 may use external services 203 to implement the functionality of providing interactive sessions between customers and representatives. For instance, the contact center 200 in this example uses a voice service 204A from a first external service provider, a messaging/chat service 204B from a second external service provider, a video service 204C from a third external service provider, a social media service 204D from a fourth external service provider, and so on. In various examples, the contact center 200 may use any combination of external or internal communication services.

The external services 203 may include communication services to implement interactive sessions between a customer and a contact center representative, as well as additional services/tools to support additional features and functionalities of the contact center. For instance, one or more third-party tools 205 may be provided via external service providers and accessed by the internal systems of the contact center 200. Such third-party tools 205 may include, by way of illustration only, transcript generation and/or analysis tools, customer sentiment analysis tools, sales script tools, contact monitoring tools, data analytics tools, workforce management tools, post-interactive session survey tools, etc. As with the communication services 204A-204E, the third-party tools 205 are depicted in this example as external components of the contact center, but some or all of these tools may be implemented as internal components within the contact center.

As shown in FIG. 2, a customer may initiate communication via a web portal 220 or voice gateway 222, after which the contact center components select a communication service 204A-204E based on the communication type used by the customer, and an interactive session is initiated between the customer device 208 and representative client device 210. Although in this example the customer devices 208 are depicted as initiating communication sessions by first contacting an internal component of the contact center (e.g., web portal 220 or voice gateway 222), in other examples the customer devices 208 may initially contact an external communication service 204A-204E. For example, customer service links on the organization's web site may be hosted by and/or redirected to the external services 203. In some cases, the customer communication into the contact center may be answered first by an automated computer system (e.g., implemented within an external service or an operations system 214), which requests a series of inputs from the customer. Such automated systems may be implemented as voice response units for voice calls, conversation bots for web chat sessions, etc. The inputs requested from the customer via an automated system may include data identifying the customer (e.g., customer name, account number, ticket number, etc.), the purpose of the contact (e.g., a question type, a product model, etc.), or the language or geographic region of the customer, and the like. Based on the customer's responses, the automated system may determine where to direct the customer for an interactive session, for instance, to a particular data center, department of the organization, a representative having a particular role, criteria, or credentials, or to a particular representative that has had previous contact with the customer.

In some examples, certain internal components of the contact center may be used to select a communication service provider 204 and initiate a communication session between a customer device 208 and a client device 210, after which the internal components may extricate themselves from the process and allow the selected communication service provider 204 to manage the session. For example, as described below, operations systems 214 and internal computer servers and/or components within the integration layer 216 may receive and analyze data associated with incoming requests for interactive sessions from customer devices 208, and assign the interactive sessions to services 204 and client devices 210 to perform the interactive session. The operations systems 214 and integration layer 216 also may receive and handle requests to transfer contacts from one representative to another, initiate multi-party interactive sessions, and initiate communication sessions between client devices 210 and administrator client devices 212 or entities within the contact center environment. The various operations systems 214 and components within the integration layer 216 also may monitor and analyze the interactive sessions to determine performance metrics for representatives and the contact center as a whole, and to implement policies and instructions based on various models (e.g., contact quality models, efficiency models, workflow projection models, etc.).

The integration layer 216 may provide a common interface between the internal systems and components of the contact center and the external services 203 used by the contact center. For example, representative client devices 210 may communicate with the external communication services 204A-204E and third-party tools 205 via the components within the integration layer 216. In some cases, the integration layer 216 provides a common framework for interfacing with the external services 203, so client applications executing on representative client devices 210 may perform similar or identical operations regardless of which external service provider is used. In such examples, the integration layer 216 may therefore provide technical advantages and improve the functioning of the contact center components by providing support for plug-and-play among the external communication services 204 and/or the third-party tools, without requiring any software change within the client applications executing on the representative client devices 210, the administrator client devices 212, and/or the customer device(s) 208.

For instance, a voice service 204A provided by a third-party vendor for a contact center may be replaced by a different voice service 204A provided by a different third-party vendor, without requiring any functional change to the client applications executing within the representative client devices 210 and/or the administrator client devices 212. Similarly, the integration layer 216 may interface with multiple different external services 203 for a single communication type (e.g., multiple different voice services 204A, multiple different messaging/chat services 204B, etc.) simultaneously, so the contact center can use multiple external services 203 for a single communication type at the same time, in a manner that is transparent with respect to the external services 203, the representative client devices 210, and/or the administrator client devices 212. In such cases, an external communication service 204 may operate similarly or identically regardless of whether the contact center is using another service provider to provide an alternative communication service. The representative client devices 210 and/or the administrator client devices 212 also may operate similarly or identically regardless of which of the external services 203 (or the internal services in the dotted box 202) is providing an interactive session for the representative client device 210.

The integration layer 216 also may provide an interface between internal components of the contact center (e.g., the representative client devices 210, the administrator client devices 212, the operations systems 214) and third-party tools 205 which operate as services or applications external to the contact center 200. For instance, the internal operations systems 214 of the contact center may access third-party tools 205, such as data analytics tools, workforce management tools, etc., via the integration layer 216. The representative client devices 210 also may access the third-party tools 205 via the integration layer 216 during an interactive session between a representative and customer. The third-party tools 205 can include customer sentiment tools, post-interactive session survey tools, or the like. As noted above, the integration layer 216 may provide a uniform and common interface for accessing external third-party tools 205, so that various third-party tools 205 may be added, removed, replaced, or upgraded, without requiring any changes to the application software of the contact center internal components.

Additionally, the integration layer 216 may provide an interface between various internal components of the contact center. For example, the representative client devices 210 may communicate via the integration layer 216 with other of the representative client devices 210, with the administrator client devices 212 and/or with other internal servers/systems of the contact center 200. For instance, the integration layer 216 may perform operations associated with sending and receiving messages within the contact center 200. For instance, and with reference to FIG. 1, the integration layer 216 may manage and/or have access to the message queue 128, may receive the message information 124 from the administrator device 104, and/or may cause the messages 118 to be displayed at the first representative device 106(1) and the third representative device 106(3). Moreover, the operations system(s) 214 may be implemented within internal computer servers of the contact center, and may provide functionalities for common queuing, monitoring, and analysis and modeling, and policy implementations across the contact center. As described below, client devices 210 may communicate with various operations system(s) 214 via the integration layer 216, allowing the operations system(s) 214 to receive data regarding the interactive sessions executed on the client devices 210, analyze and/or model the data, and determine operational instructions for the client devices 210 to implement operational models (e.g., rules and/or policies) across the contact center. Such models may include quality control models, workforce management models, contact center efficiency models, etc.

As illustrated by these examples and the other examples described herein, the integration layer 216 may provide additional technical advantages within contact center environments, including improving the functioning and efficiency of client devices 210 and other internal operational systems 214. For instance, the integration layer 216 may provide a common queuing framework for client devices 210, which is capable of managing the work queue(s) for the client devices 210 (e.g., live customer contact queues, deferred work item queues, etc.) received from various external and internal contact center services. As noted above, the integration layer 216 also may provide internal operational systems 214 with detailed data regarding interactive sessions from diverse client devices 210 in a consistent and uniform manner, allowing the operational systems 214 to improve the performance, contact quality, and workflow across the contact center. Operational systems 214 also may include rules engines using heuristics and/or trained machine-learned models to analyze the interactive session data received from different client devices 210, and may transmit instructions and/or policies to client devices 210 across the contact center to implement uniform and consistent models.

The integration layer 216 is depicted in FIG. 2 as a separate internal component of the contact center. In such examples, the integration layer 216 may include one or more dedicated computer servers and/or software applications or services configured to perform the functionalities of the integration layer 216 described herein. In other examples, the integration layer 216 depicted in FIG. 2 may represent a conceptual layer, in which some or all of the components and functionalities of the integration layer 216 may be implemented within other internal or external devices and systems. For instance, any or all portions of the integration layer 216 may be implemented within the external communication services 204 and/or other external services provided by third-party vendors. Additionally or alternatively, some or all of the integration layer 216 may be implemented within the client devices 210, administrator client devices 212, and/or operations systems 214 within the contact center. For example, the client devices 210 may run a desktop application and/or communication façade(s) to initiate and manage communications with external services 204 and other internal components/systems. These applications, façades, and other services or interfaces of the client devices 210 and/or other operations systems 214 of the contact center may implement various portions of the integration layer 216.

Figure 3:
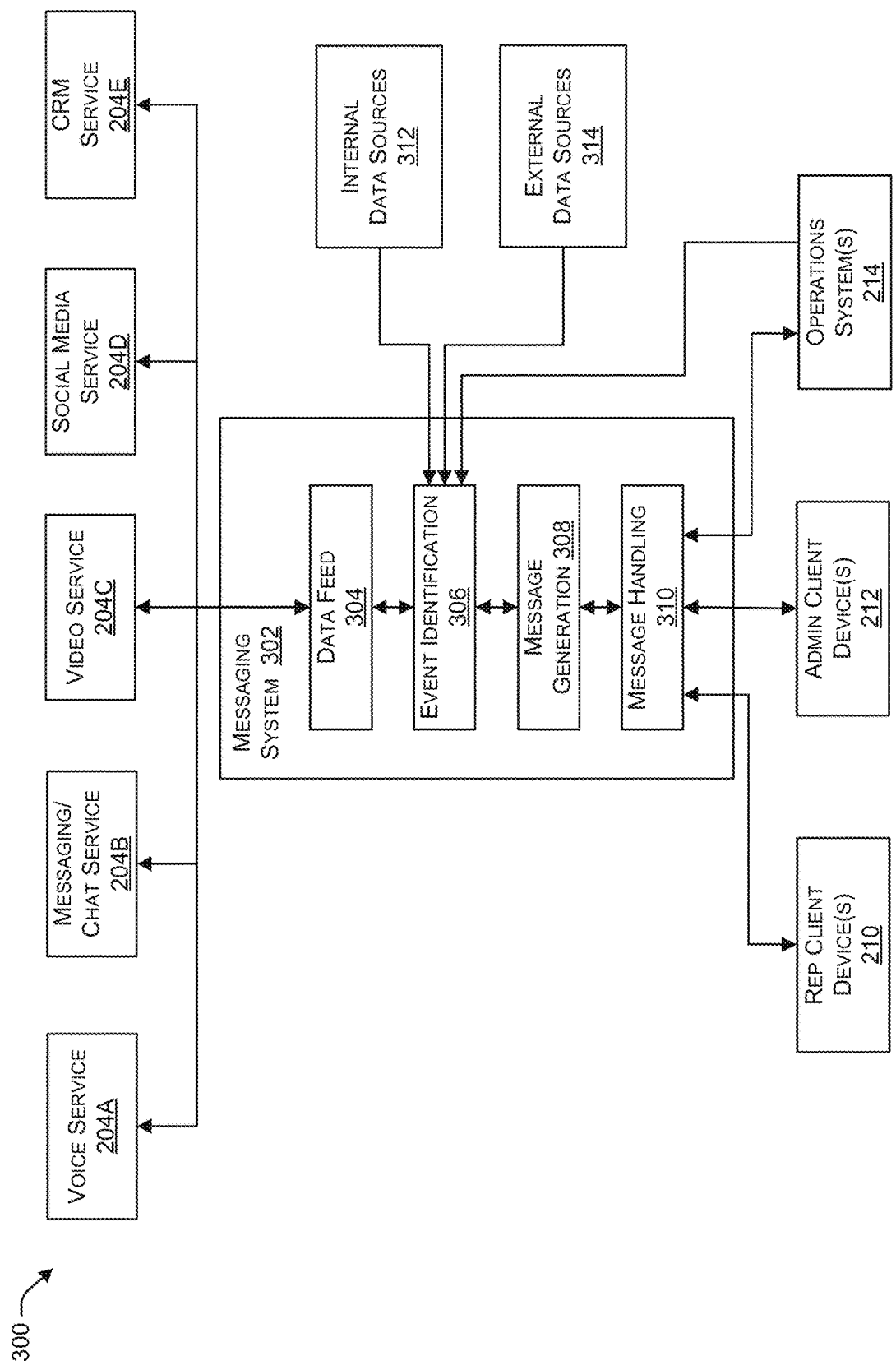
FIG. 3 illustrates an example of a client software framework for a representative client device, in accordance with one or more examples of the present disclosure.

FIG. 3 illustrates a computing architecture 300 including a messaging system 302 with various components for receiving, generating, and/or transmitting messages. For example, the computing architecture 300 may be a portion of a contact center environment, such as the contact center server 102 and/or the contact center 200. In this example, the messaging system 302 includes a data feed component 304, an event identification component 306, a message generation component 308, and a message handling component 310. As detailed further below, the various components of the messaging system 302 may receive, store, and use data from various different sources, including data relating to live contacts handled by the contact center 200. A live contact may refer to an ongoing communication session between one of the customer device(s) 208 and the various components of the contact center 200, including customer-requested sessions that are in-queue and awaiting assignment, on-hold, as well as active interactive communication sessions between the customer device(s) 208 and one of the representative client device 210.

In various examples, the messaging system 302 may be implemented as a single computing device or server, or as a combination of multiple interconnected devices and/or servers, e.g., within the integration layer 216 of the contact center 200. As such, the messaging system 302 and associated software components, e.g., one or more of the data feed component 304, the event identification component 306, the message generation component 308, and/or the message handling component 310 may include and/or may be executed on hardware-based computing devices or servers having hardware/network infrastructures and components such as processor(s), computer-readable memory, network interface(s), etc. Additionally or alternatively, some or all portions of the messaging system 302 and/or its associated components described herein may be implemented within other systems internal or external to the contact center 200, such as within representative client devices 210, administrator client devices 212, and/or within the operations system(s) 214 of the contact center 200.

A contact center 200 may support a number of different communication session types, which may be initiated, managed, and/or supported by the communication service providers 204. In various examples, the communication service providers 204 may be external to the contact center 200. In this example, the messaging system 302 may receive information from the communication service providers 204A-204E to establish network connections and stream media between customer device(s) 208 and the representative client device(s) 210. When the contact center receives a customer request for an interactive session, the request may be assigned to a particular one of the communication service providers 204 based on the communication media type and/or based on the communication gateway or portal from which the customer accessed the contact center (e.g., voice, video, web chat, social media, etc.). The assignment may also be based on one or more other criteria, including but not limited to a geographic location or region of the customer, current service provider status, current contact center status, or the like. If a qualified representative is immediately available to handle the request, the contact center, using services from the communication service providers 204, may establish the network connections to initiate and manage the interactive session between the customer device(s) 208 and the representative client device 210 of the available representative. Otherwise, the customer request may be queued during which the customer device(s) 208 may remain connected to the contact center, e.g., a representative is available to handle the contact.

At any time during a live contact with the customer device(s) 208, including when the contact is in-queue, on-hold, or when the contact is connected to a representative client device 210, the contact center 200 may generate data relating to the live contact. As shown in this example, the live contact-related data may be transmitted from the service providers 204 to the messaging system 302, e.g., the data feed component 304. For instance, the communication service providers 204 may output data indicating a change in the status of the live contact, such as when the contact is first received, queued, connected to one of the representative client devices 210 or one of the administrative client devices 212, placed on hold, disconnected or terminated, etc. Additionally, the communication service providers 204 may generate and output data based on any user inputs received via the customer device(s) 208 before the customer is connected to a representative, such as the customer's responses to an automated menu or voice response unit (VRU) for voice contacts, or responses to a conversation bot for web chat contacts. The communication service providers 204 also may generate and output status data relating to the network connection and quality (e.g., network types and access networks, network traffic and performance, available bandwidth, etc.) and media quality (e.g., media resolution, latency issues, buffering events, etc.).

The data feed component 304 within the messaging system 302 may receive data from communication service providers 204 relating to the current live contacts (e.g., queued, on-hold, or during an interactive media session) of the contact center 200. Depending on the size and scale of the contact center 200, the data feed component 304 may receive data associated with hundreds or even thousands of live contacts concurrently. In some examples, the messaging system 302 may subscribe to receive steams of event data from the communication service providers 204 relating to live contacts for the contact center 200. Such subscriptions may include push notifications transmitted from the communication service providers 204 to the data feed component 304, where each notification subscription may include events for a single contact, group of contacts, or for all contacts associated with the contact center environment 100. In some instances, the communication service providers 204 may output event data to cloud-based data stores or other data repositories. In such cases, the data feed component 304 may subscribe to receive event notifications from the cloud data stores/repositories, or may periodically query the cloud data stores/repositories to retrieve the updated event data for any live contacts of the contact center 200.

The event identification component 306 may receive information from the data feed component 304 and determine events. As used herein, an event may be any condition, occurrence, or circumstance that may affect people or devices associated with the contact center 200. For instance, an event may affect a segment of customers of the business operating the contact center 200. In one example, the business operating the contact center 200 may be an insurance provider, and the event may be a weather-related occurrence in a geographic area impacting, or that may impact, policy-holders in that area. In another example, the event may be an event that affects one or more functional components of the contact center 200. For instance, one of the communication service providers 204 may be experiencing technical difficulties, and the event may be the unavailability of the specific provider. In a still further example, an event may be information that impacts representatives that access the contact center 200 via the representative client devices 210. For instance, the event may be associated with introducing availability of new training and/or support materials for the representative.

In addition to receiving information from the data feed component 304, the event identification component 306 is also illustrated as receiving information from internal data sources 312 and external data sources 314. For instance, information from the internal data sources 312 and/or the external data sources 314 may also or additionally be used to determine an event. By way of example, if the data initially available for a customer request to the contact center includes customer device data (e.g., a customer phone number, device identifier and/or network address), then the event identification component 306 may use the initial customer device data to retrieve additional customer-related data from the internal data sources 312 of the organization, such as the customer's name and account data, previous customer claims data, customer billing data, etc. Additionally, the event identification component 306 may use the data initially available (e.g., customer phone number and/or network address) to retrieve customer-related data from the external data sources 312, which may include external governmental databases, educational institutions, financial institutions, workplace databases, social media servers, or other third-party data sources. Data from the internal data sources 312 and/or from the external data sources 314 may include customer demographic data (e.g., age, occupation, marital status), geographic data (e.g., the customer's home state, county, or city, and/or the customer's current location), financial/purchase data (e.g., income, recent larges purchases, etc.), or life event data (e.g., recent marriages, divorces, children, etc.).

Data from the internal data sources 312 and/or the external data sources 314 also may be independent of any customer contact with the contact center 200. For instance, the internal data sources 312 can include information about functioning of the computing systems and components of the contact center 200. Information from the internal data sources 312 can also include information about updates to aspects of the contact center, including updates to procedures, policies, equipment, functionality, or the like. The external data sources 314 can include third-party information providers. Without limitation, the event identification component 306 can receive weather information, newsfeeds, social media information and/or other information that may be relevant to events. As also illustrated, the event identification component 306 can receive information from the operations system(s). The event identification component 306 can receive any information, from any sources, that may be used to determine an occurrence of an event, as detailed further herein.

As noted above, the event identification component 306 includes functionality to determine events associated with the contact center 200 and/or with individuals associated with the contact center 200. Generally, the event identification component 306 receives the information from the communication service providers 204, the internal data sources 312, the external data sources 314, the operations system(s) 304, and/or any other sources and processes this information to determine events. For instance, the event identification component 306 can include a rules engine executing heuristics-based logic to analyze the received data and determine that an event has occurred and/or is likely to occur, based on the data. Additionally or alternatively, the event identification component 306 may include various machine-learned models and algorithms to process the data. Various combinations of machine-learned models and algorithms may be used in different implementations, including but not limited to regression algorithms, instance-based algorithms, Bayesian algorithms, decision tree algorithms, clustering algorithms artificial neural network algorithms, and/or deep learning algorithms. The machine-learned models and algorithms within the event identification component 306 may output a predicted or recognized event (e.g., natural disaster, hardware or software malfunction, release of new operating procedures, service interruptions, or other event) and a confidence value or metric associated with such determination.

In one non-limiting example, the data feed component 304 can include voice data from the voice service 204A, which can include an audio file including voice inputs received from several of the customer device(s) 208. In this example, the contact center 200 is associated with an insurance provider. The event identification component 306 may perform speech-recognition on the audio files to determine that some number (e.g., a threshold number) of customers have used the term "flood" while interacting with the call center 200 using the voice service 204A. Based on these uses of the term "flood," the event identification component 306 may determine that some number of customers are experiencing flooding. Also in this example, e.g., using the internal data sources 312, the event identification component 306 can determine that the customers using the term "flood," are located proximate each other, e.g., in a similar geographic area. Moreover, using the external data sources 314, the event identification component 306 can confirm that the geographic area is experiencing (or has experienced) heavy rains or the like. Of course, this is a single example of determining an event using the event identification component 306, generally illustrating that the event determination component can receive information from disparate sources to determine the occurrence, or probability of occurrence, of some event. The event can include both the actual event, e.g., flood, and any other associated information. Such associated information can include, but is not limited to, an area impacted by the event, users affected by the event, a duration (or likely duration) of the event, and/or other information.

The message generation component 308 includes functionality to generate a message based on the event determined by the event identification component. For example, the message generation component 308 can include or access a database that stores pre-generated messages and associations of those messages with events. For instance, and continuing the example above, the message generation component 308 may generate message text such as "Flood in Geographic Area A," where "Geographic Area A" corresponds to the flood locale determined by the event identification component 306. In addition to generating the text associated with the message, the message generation component 308 can also include functionality to associate one or more recipients with the message. For instance, if contacts to the contact center 200 are assigned based on geographical proximity to a source of the contact, the recipients for the message in the foregoing example may be the representative client devices 210 proximate the geographic area associated with the flood. In other examples, contacts to the contact center 200 may be routed based on policy-type, and the message generation component 308 may identify the recipients for the example message as the representative client devices 210 associated with representatives providing services related to policies impacted by the flood. Of course, these are for example only.

In some examples, the message handling component 310 may include functionality to receive message information, e.g., from the message generation component 308 and facilitate display of the message on user devices associated with the appropriate recipients. In some examples, the message handling component 310 includes functionality to generate and/or maintain a message queue, such as the message queue 128. The message handling component 310 can receive requests from the representative client devices 210 and/or the administrator client devices 212 and determine whether the device(s) are to receive a message.

Although not illustrated in FIG. 3, the message handling component 310 may also include functionality ascribed in FIG. 1 to the messaging component 126. For instance, the message handling component 310 may be the messaging component 126 and/or include functionality associated with the messaging component 126. For example, and without limitation, the message handling component 310 can facilitate display of the message generation user interface 112 and/or receive the message information 124 from the administrator device 104. Thus, the message handling component 310 can receive messages generated by the message generation component 308 and/or by the administrator client devices 212. The message handling component 310 can also distribute messages to the representative client devices 210 and/or the administrator devices 212. For instance, the message handling component 310 can broadcast or otherwise transmit messages to intended recipients.

In some examples, messages generated by the message generation component 308 may be presented for approval prior to being stored by, e.g., in the message queue 128, and/or distributed, e.g., broadcast, by the message handling component 310. For instance, messages generated by the message generation component 308 may be presented to an administrator, e.g., via one of the administrator devices 212, for approval for sending. In at least some instances, messages generated by the message generation component 308 may be included in the messages 118. Also in examples, messages generated by the message generation component 308 may be presented to an administrator with a confidence associated with the message. The confidence may be a confidence value, e.g., a probability, associated with an event determined by the event identification component 306, with the content or correctness of the message, with recipients indicated as being targeted with the message, and/or with other aspects of the message.

Figure 4:
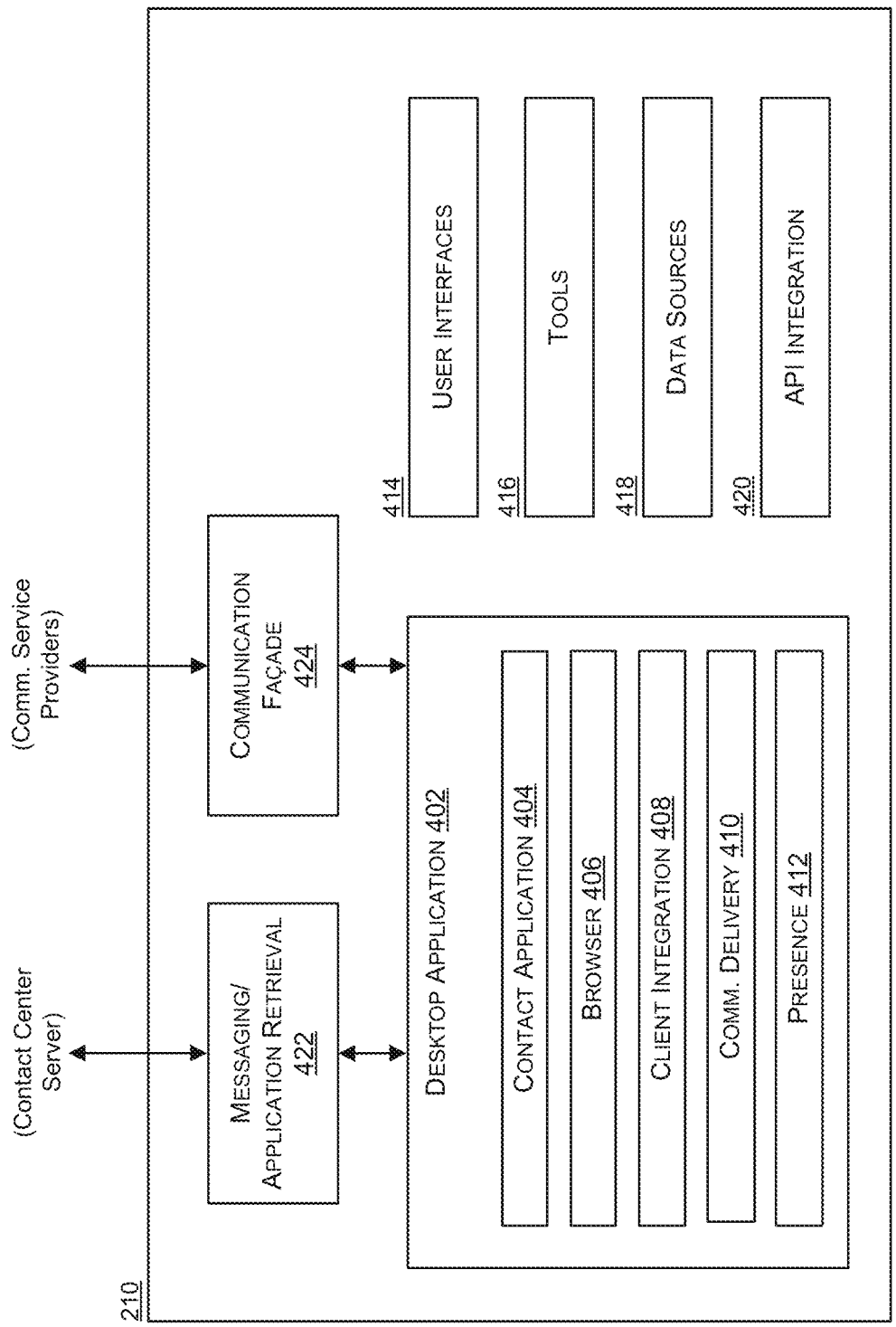
FIG. 4 illustrates an example of a client software framework for an administrator client device, in accordance with one or more examples of the present disclosure.

FIG. 4 illustrates an example client software framework for one of the representative client devices 210. The software components depicted in FIG. 4 may implement the various functionalities of the representative client device 210 operating within a contact center, such as the contact center 200. Using a software framework similar or identical to that depicted in this example, a desktop application 402 and/or other software components running on the client device 210 may receive and execute interactive sessions with customer devices 208 via a contact application 404. The desktop application 402 also may interact with various other internal and external components associated with the contact center 200 to support common queuing from internal and external sources, and integrated contact center monitoring and modeling, as described herein.

The example software framework shown in FIG. 4 may be implemented as a thick client framework. As a result of using a thick client framework like that depicted in this example, a larger portion of the processing tasks to provide the representative functionality in the contact center may be performed on the representative client device 210, while less of the processing tasks are performed on the servers of the contact center. In some examples, a thick client framework similar or identical to that shown in FIG. 4 may provide technical advantages in executing the multimedia components and processing the bandwidth intensive communication sessions of the representative client device 210.

The desktop application 402 may be installed on the representative client device 210 to initiate and execute interactive sessions for the contact center. As noted above, communication sessions via the contact center allow an organization representative on a representative client device 210 to interact with a customer on external customer devices 208, using any of the supported communication types (e.g., voice, messaging/chat, email, video, social media, etc.). To enable communication sessions, the desktop application 402 may access and run a contact application 404 that connects to an external communication service, like the communications service providers 204A-204E, receive and transmit user input from the local representative, and output the customer multimedia data received from the external communication service.

In some examples, the desktop application 402 may be a multi-process (or multi-threaded) application. For instance, each of the components 404-412 depicted within the desktop application 402 may correspond to a separate computing process. The desktop application may include functionality to perform queue control, contract tracking, operational metrics, and broadcast functionality for the desktop application 402. As discussed herein in more detail, in some cases the desktop application 402 facilitates retrieval and running of a containerized application as the contact application 404. The containerized application may be received from a server as a container image with packaged code along with an IID identifier. The desktop application may include functionality to unpack and launch the contact application on the representative client device 210 to provide the representative functionality. The browser process 406 may be a lightweight (or thin) customized browser. For instance, the browser process 406 may execute the initial logic of the desktop application 402, including managing the representative login and authentication functions, after which an appropriate application may be retrieved and downloaded from a server of the contact center, e.g., as the contact application 404. Additionally, as shown in this example, the desktop application 402 may include a separate client integration process 408, a communication delivery process 410, and a presence process 412.

As shown in this example, the software framework of the representative client device 210 may include a number of additional software components, including user interfaces 414, tools 416, data sources 418, API integration components 420, a messaging/application retrieval component 422 and/or a communication façade 424.

In some examples, the desktop application 402 may use the API integration components 420 to access the APIs exposed by the operating system of the representative client device 210. Such implementations may provide technical advantages over other contact center client applications. For instance, web browser-based and other thin client applications for contact center representatives may be unable to access the native APIs exposed by the client device. In contrast, the thick client framework examples described herein may provide advantages of web-based thin clients (e.g., uses of web-based techniques and protocols such as JS, CSS, and HTTPS to communicate with external services 203 during interactive sessions), along with advantages of thick clients including access to the file system and native APIs of the representative client device 210. In some examples, the desktop application 402 may record various state data of the representative client device 210 before, during, and/or after an interactive session with a customer (e.g., other open applications and windows, user behaviors and actions performed by the representative on the representative client device 210, etc.). The state data of the representative client device 210 may be analyzed along with the corresponding data associated with the interactive session (e.g., interaction transcript, customer sentiment, outcome/resolution of the contact, etc.), to provide more robust data for analyzing interactive sessions and representative performance in the contact center environment. Additionally, the multi-threaded thick client framework may improve the technical and/or digital quality of multimedia communication sessions (e.g., voice and/or video) provided via the contact center. For instance, the desktop application 402 may operate a first computing process (e.g., a thin web browser) to execute the application logic and may launch a second computing process to handle a new interactive multimedia session with a customer. When the representative client device 210 includes multiple processors, the desktop application 402 also may assign the second computing process handling the communication session to a particular processor based on the current processor loads, network traffic, and/or quality thresholds for multimedia sessions, in order to assure a higher-quality multimedia session with dedicate hardware, memory, and software resources.

The messaging/application retrieval 422 and the communication façade 424 may be software objects that common interfaces between the desktop application 402 and, respectively, the contact center 20 and the external communication services 203. In some examples, the messaging/application retrieval component 422 and the communication façade 424 may be implemented as services running on the representative client device 210, which expose APIs that may be invoked by an internal application (e.g., desktop application 402) and/or external applications (e.g., communication services 204). The messaging/application retrieval component 422 and the communication façade 424 may be part of the integration layer 216 discussed above. Additionally, although the messaging/application retrieval component 422 and the communication façade 424 may execute on the representative client device 210 as shown in this example, one or both the messaging/application retrieval component 422 and the communication façade 424 may be implemented outside of the representative client device 210 in other examples.

The messaging/application retrieval component 422 includes functionality allowing the desktop application 402 to query for new messages. For instance, the messaging/application retrieval component 422 may query the message queue 128 for new messages. In some examples, such querying may occur when the representative using the representative client device 210 logs into the desktop application, when the representative client device 210 requests an application, e.g., as the contact application, when a new contact interaction is begun, upon completion of a contact interaction, or at any other time. The messaging/application retrieval component 422 can institute conventional messaging formats and protocols, such as SMS, MMS, or the like.

The communication façade 424 also may provide a common interface between the desktop application 402 and/or the contact application 404 and the external communication servers 204A-204E. The communication façade 424 includes the capabilities to deliver media (e.g., text, audio data, video data, etc.) to and from the representative client device 210 during an interactive session with a customer. In some scenarios, after the representative user begins work with the desktop application 402 (e.g., authenticates and/or logs-in), the desktop application 402 may transmit a device registration to one or more of the external services 203. The device registration may include an IP address associated with the communication façade 424. The external services 203 may transmit media content to the communication façade 424 during subsequent interactive sessions, and the communication façade 424 may relay the media content to the desktop application 402, e.g., via the contact application 404 for presentation to the user.

Figure 5:
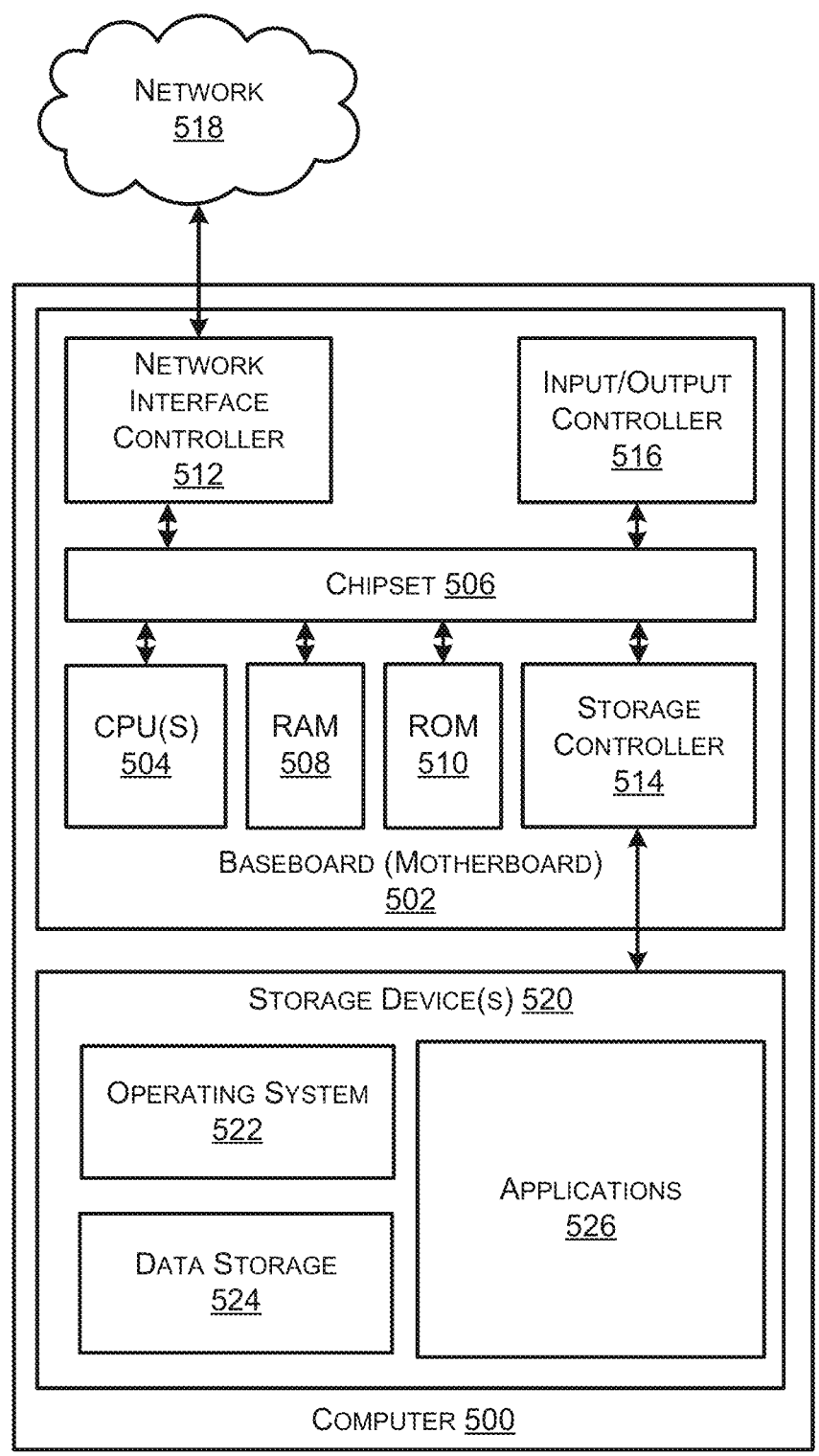
FIG. 5 is an example architecture for a computing device capable of executing program components for implementing various techniques described herein.

FIG. 5 shows an example computer architecture for a computer 500 capable of executing program components for implementing the functionality described herein. The computer architecture shown in FIG. 5 may correspond to the systems and components of a server computer, workstation, desktop computer, laptop, tablet, network appliance, mobile device (e.g., tablet computer, smartphone, etc.), or other computing device, and can execute any of the software components described herein. The computer 500 may, in some examples, correspond to any of the computing systems or devices described above, such as the representative client devices 210, administrator client devices 212, operations system(s) 114, internal servers, and/or any other computing devices described herein. It will be appreciated that in various examples described herein, a computer 500 might not include all of the components shown in FIG. 5, can include additional components that are not explicitly shown in FIG. 5, and/or may utilize a different architecture from that shown in FIG. 5.

The computer 500 includes a baseboard 502, or "motherboard," which may be a printed circuit board to which a multitude of components or devices are connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a ROM 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as the network 518, which may be similar or identical to the network(s) 206 discussed above. The chipset 506 also may include functionality for providing network connectivity through a Network Interface Controller (NIC) 512, such as a gigabit Ethernet adapter. The NIC 512 is capable of connecting the computer 500 to other computing devices over the network 518. It should be appreciated that multiple NICs 512 can be present in the computer 500, connecting the computer to other types of networks and remote computer systems. In some instances, the NICs 512 may include at least on ingress port and/or at least one egress port.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device.

The computer 500 can include one or more storage device(s) 520, which may be connected to and/or integrated within the computer 500, that provide non-volatile storage for the computer 500. The storage device(s) 520 can store an operating system 522, data storage systems 524, and/or applications 526, which are described in more detail herein. The storage device(s) 520 can be connected to the computer 500 through a storage controller 514 connected to the chipset 506. The storage device(s) 520 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device(s) 520 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 520 are characterized as primary or secondary storage, and the like.

For example, the computer 500 can store information to the storage device(s) 520 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device(s) 520 by detecting the physical states or characteristics of one or more particular locations within the physical storage units.

In addition to the storage device(s) 520 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the various operations performed by a computing system (e.g., representative client devices 210, internal servers 302, etc.) may be supported by one or more devices similar to computer 500. Stated otherwise, some or all of the operations described herein may be performed by one or more computers 500 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 520 can store an operating system 522 utilized to control the operation of the computer 500. In some examples, the operating system 522 comprises a LINUX operating system. In other examples, the operating system 522 comprises a WINDOWS® SERVER operating system from MICROSOFT Corporation of Redmond, Wash. In further examples, the operating system 522 can comprise a UNIX operating system or one of its variants. It should be appreciated that other operating systems can also be utilized. The storage device(s) 520 can store other system or application programs and data utilized by the computer 500.

In various examples, the storage device(s) 520 or other computer-readable storage media is encoded with computer-executable instructions which, when loaded into the computer 500, transform the computer from a general-purpose computing system into a special-purpose computer capable of implementing various techniques described herein. These computer-executable instructions transform the computer 500 by specifying how the CPUs 504 transition between states, as described above. In some examples, the computer 500 may have access to computer-readable storage media storing computer-executable instructions which, when executed by the computer 500, perform the various techniques described herein. The computer 500 can also include computer-readable storage media having instructions stored thereupon for performing any of the other computer-implemented operations described herein.

As illustrated in FIG. 5, the storage device(s) 520 may store one or more data storage systems 524 configured to store data structures and other data objects. Additionally, the software applications 526 stored on the computer 500 may include one or more client applications, services, and/or other software components. For example, for a representative client device 210, application(s) 526 may include client applications 202, queue and communication facades 422 and 424, and/or other software components described in reference to FIG. 2. For an example internal server, the applications 526 may include the event identification component 306, the message generation component, and the message handling component 310 described with reference to FIG. 3.

Figure 6:
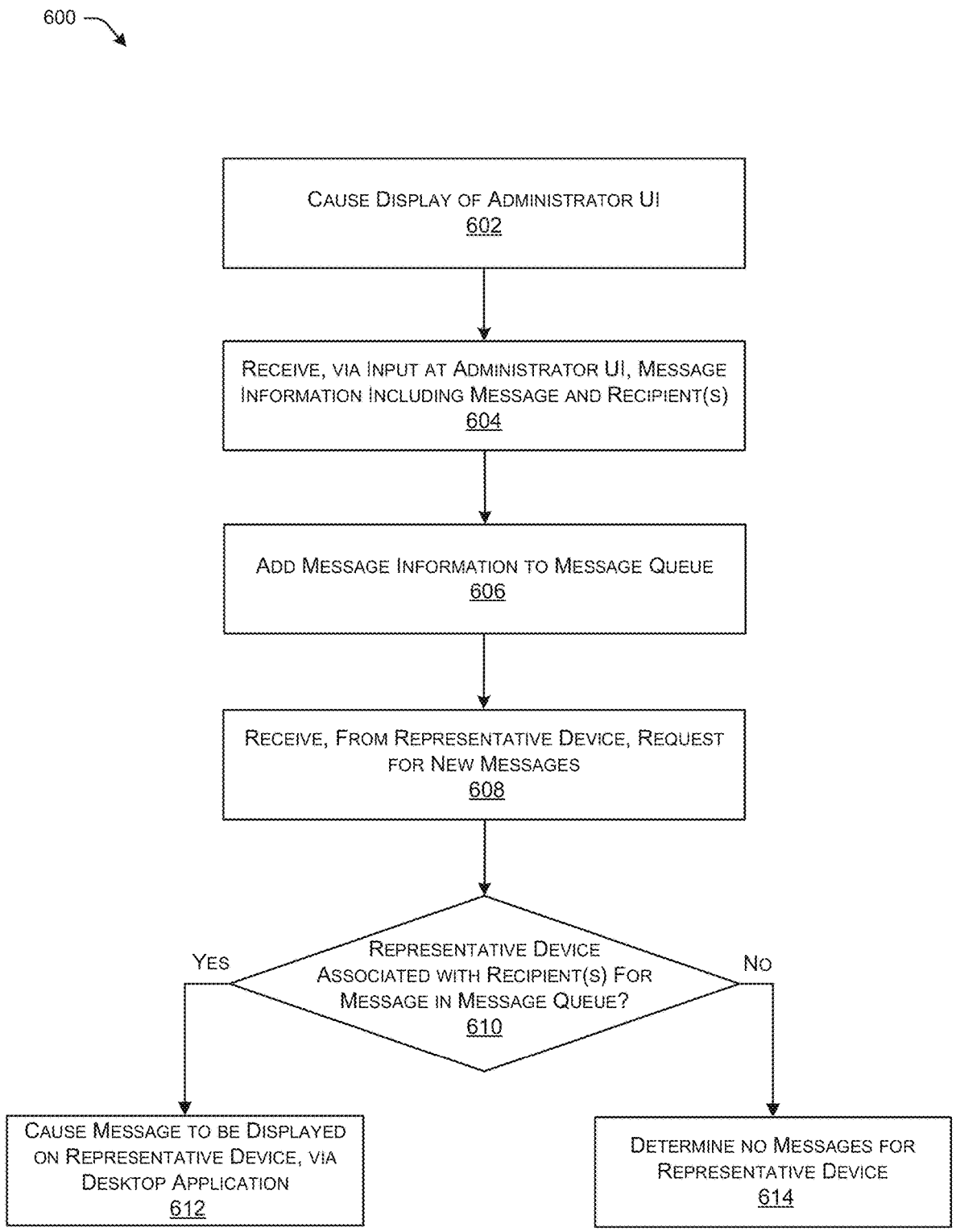
FIG. 6 is a flow diagram illustrating an example process performed by a contact center, in accordance with one or more examples of the present disclosure.

FIG. 6 is a flow diagram illustrating a process 600 of transmitting messages in a contact center. Aspects of the process 600 may be implemented by the contact center server 102, the contact center 200, and/or other aspects described herein. However, the contact center server 102 and the contact center 200 are not limited to performing the process 600.

At an operation 602, the process 600 includes causing display of an administrator UI. As detailed herein, a contact center computing architecture can facilitate interaction of customers with representatives and/or administrators associated with a business or other organization. The contact center computing architecture can also coordinate communication between administrators and representatives. In one example, the operation 602 can include presenting the message generation user interface 112 on an administrator device, such as the administrator device 104 and/or the administrator device(s) 104. In examples, the message generation user interface can facilitate a number of user inputs, e.g., by an administrator.

At an operation 604, the process 600 includes receiving, via input at the administrator UI, message information including a message and one or more recipients. For example, the message generation user interface 112 shown in FIG. 1 includes a list of messages 118 from which an administrator can choose one or more messages for distribution. The message generation user interface 112 also includes a list of recipients 120 that may be selected by the administrator to receive the message(s). In some instances, the administrator UI may provide functionality to directly input new messages, such as via text box, dictation, or the like. Also in examples, and as described in connection with FIG. 3, messages may be automatically generated, e.g., by the messaging system 302 and presented for consideration by the administrator.

At an operation 606, the process 600 includes adding message information to a message queue. For example, and in response to an administrator selection of a message and recipients for that message, the administrator client device may generate message information, such as the message information 124. The message information 124 may include information in addition to the message and recipients, such as duration information and/or other information. The message information 124 may be stored by a centralized application or server, such as the contact center server 12 for subsequent distribution to the appropriate recipients. In the example of FIG. 1, message information is stored in the message queue 128.

At an operation 608, the process 600 includes receiving, from a representative device, a request for new messages. For example, a representative device running a desktop or background application associated with the contact center server may send requests for new messages automatically, e.g., when representative logs into their device, at a predetermined frequency, the occurrence of some event, or otherwise.

At an operation 610, the process includes determining whether the representative device is associated with one or more recipients for a message in the message queue. Without limitation, the operation 610 can include the contact center server determining whether the recipient device from which a request for new messages was received is associated with a recipient of each of the messages stored in the message queue 128.

If, at the operation 610 it is determined that a request for messages is from a representative device that is associated with a recipient for one of the messages in the message queue, and operation 612 the messages cause to be displayed on the representative device, via the desktop application. For instance, the message may be displayed as a banner or other prominent display via the user's desktop application, without the need for the representative to be running a specialized messaging or communication app. The functionality of message generation and distribution is integrated into the desktop application, which is hosted at the contact center, and via which all other operations, including accessing applications or the like, are undertaken.

Alternatively, if at the operation 610 is determined that a request for messages is not from a representative device is associated with a recipient for one of the messages in the message queue, at an operation 614 the process 600 determines that there are no messages for the representative device.

The foregoing process 600 provides an example process by which messages are generated and distributed in a contact center environment in which administrators can provide important information directly to representatives, e.g., without the need for the representatives to be running a specific application and/or checking that application for new messages. According to methods described herein, messages can be broadcast to all appropriate representatives without being bound by limitations and requirements of those conventional messaging applications.

Figure 7:
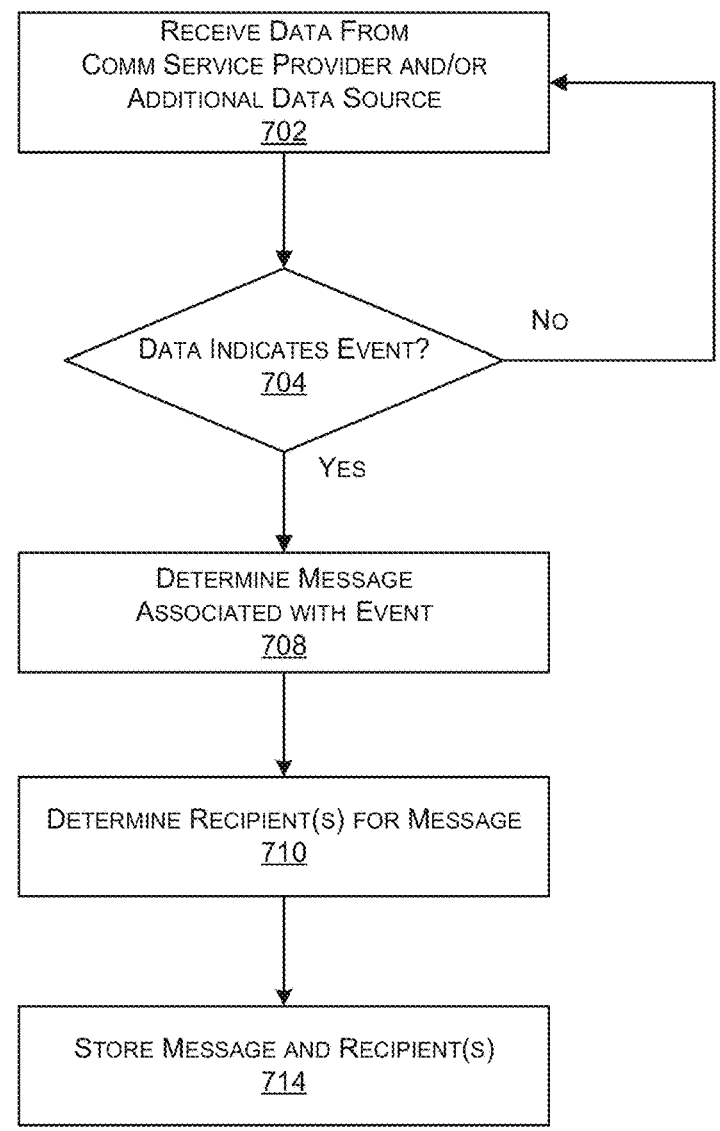
FIG. 7 is a flow diagram illustrating an example process for generating messages in a contact center, in accordance with one or more examples of the present disclosure.

FIG. 7 is a flow diagram illustrating an example process 700 of automatically generating messages for distribution to administrators and/or representatives operating in a contact center environment. As discussed below, the techniques and operations of process 700 may be performed by various systems and components within the contact center computing environments 100, 200 and 300, such as the contact center server 102, the messaging system 302, and/or other software components of the contact center described herein.

At an operation 702, the process 700 includes receiving data from a communications service provider and/or additional data source. Examples detailed herein, a contact center may facilitate interaction of customer with a representative associated with a business or other organization. The contact center architecture may utilize a number of different applications for facilitating such interactions. In at least some examples, the contact center can leverage third-party communication service providers to interface with customers in different ways. Such interactions may be recorded and/or otherwise generate data, including data about the customer, about the interaction, about a product or service for which the customer is reaching out to the contact center, or the like. In at least one example, the operation 702 can be carried out by the data feed component 304 of the messaging system 302. Additional sources of data may include the internal data sources 312 and/or the external data sources 314.

In operation 704, the process 700 can include determining whether the data indicates an event. For example, a model, such as a heuristic model and/or a machine learned model may process the data received at the operation 702 and determine one or more events from the data. Without limitation, the event identification component 306 of the messaging system 302 can include information from the data feed computer 304, data from the internal data sources 312, and or data from the external data sources 314 and identify events. In at least one example, the event identification component 306 may include a machine learning model that is trained on previous data and events identified from that data. In some examples, the event identification component 306 can determine a probability that data suggests an event, context surrounding that event, and/or other information about the event.

If, at the operation 704, no event is determined, the process 700 may return to the operation 702 to continue analyzing new data generated via external sources, via interactions with the contact center, and/or otherwise. However, if at the operation 704 it is determined that the data does indicate an event, at an operation 706, the process 700 determines a message associated with the event. In some examples, specific events AB determined that the operation 704, and a contact center may include predetermined messages associated with such events. For instance, a contact center server may store a lookup table or other database that correlates events with messages. In other examples, information about the event determined that the operation 704 may be presented to a user of the system, such as an administrator, at the operation 706. For instance, the administrator may be presented with a description of the event, contact associated with the event, and/or other information. Using this information, the administrator may generate a message, such as via a message generation user interface 112.

At an operation 708, the process 700 includes determining one or more recipients for the message. In some examples, the recipients may be identified by an administrator, as described herein. In other examples, recipients for the message may be identified via a model. For instance, the message generation component 308 may identify appropriate recipients for message, e.g., based on data about the event type, about aspects of the event, and/or the like. In one nonlimiting example, the message generation component 308 can determine that representatives within a geographic area should be recipients of a message associated with an event happening at or near that geographic area.

In operation 710, the process 700 includes storing the message and the one or more recipients. For example, information about the message and/or the recipients, as well as other information, including but not limited to message duration information, confidence data associated with the message and/or the recipients, and/or other information, may be stored in a database accessible by aspects of the contact center 200. For instance, message and/or the recipients may be stored in message queue, such as the message queue 128. Without limitation, messages stored at the operation 710 may be distributed according to the process 600 discussed above.

In accordance with the foregoing, aspects of this disclosure describe message generation and distribution in a contact center environment. Aspects of the environment include ensuring that important messages are received by users of the system with limited to no responsibility on part of the users for seeing those messages. For instance, representatives using a contact center environment to respond to customer queries may benefit from the processes described herein by receiving important information without taking affirmative actions to install, open, and or check a separate messaging application. This may be particularly important in a contact center environment in which representatives may be using different customer interfacing applications.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A contact center server, comprising:
one or more processors; and
one or more non-transitory computer-readable media storing computer-executable instructions that, when executed, cause the one or more processors to perform operations comprising:
hosting, at the contact center server, a desktop application and a plurality of containerized applications for interacting with customers;
determining, by the contact center server, a first containerized application for a first client device, wherein the first containerized application is configured to execute interactive communication sessions on the first client device, transmitting, by the contact center server, a containerized application image including the first containerized application, to the first client device,
maintaining, at the contact center server, a message queue;
receiving message information associated with a generated message for distribution to one or more recipients;
updating the message queue to include the generated message and an identification of the one or more recipients;
receiving, from the first client device, a request for new messages, the first client device running the desktop application and the first containerized application, the desktop application being configured to send the request for new messages based at least in part on the first containerized application;
determining that the first client device is associated with a recipient of the one or more recipients; and
causing the generated message to be displayed, via the desktop application, on a display of the first client device.

2. The contact center server of claim 1, the operations further comprising:
receiving, from a second client device, a second request for generated messages, the second client device running the desktop application and a second containerized application of the plurality of containerized applications;
determining that the second client device is associated with an additional recipient of the one or more recipients; and
causing the generated message to be displayed, via the desktop application, on a display of the second client device.

3. The contact center server of claim 1, the operations further comprising:
causing display of an administrator user interface on an administrator computing device, the administrator user interface facilitating user input of the generated message and the one or more recipients.

4. The contact center server of claim 3, wherein causing the display of the administrator user interface comprises at least one of:
causing display of one or more recipient groups;
causing display of a text entry window; or
causing display of one or more predetermined messages.

5. The contact center server of claim 1, the operations further comprising:
receiving information about an event; and
generating the generated message based at least in part on the event.

6. The contact center server of claim 5, wherein:
generating the generated message comprises passing the information about the event through a machine learning model; and
the generated message is based at least in part on an output of the machine learning model.

7. The contact center server of claim 5, wherein the event comprises at least one of:
a threshold number of accesses to the contact center server;
a threshold number of accesses to the contact center server in a geographic area; or
a weather-related event.

8. The contact center server of claim 7, the operations further comprising:
identifying the event from one or more customer interactions with the contact center server, the customer interactions comprising at least one of text-based or speech-based interactions.

9. The contact center server of claim 1, the operations further comprising:
causing the generated message to be displayed on the display for a message duration.

10. The contact center server of claim 1, wherein: the desktop application runs on the first client device within a browser-based process; and the first containerized application runs on the first client device within a non-browser process configured to access one or more native APIs of the first client device.

11. The contact center server of claim 1, wherein the request for new messages is transmitted automatically by the desktop application of the first client device, in response to at least one of: an installation of the first containerized application on the first client device; a beginning of a new interactive session by the first containerized application; or an ending of an interactive session by the first containerized application.

12. A method comprising:
hosting a desktop application and a plurality of containerized applications for interacting with customers;
determining a first containerized application for a first client device, wherein the first containerized application is configured to execute interactive communication sessions on the first client device;
providing a containerized application image including the first containerized application, to the first client device;
receiving message information associated with a generated message for distribution to one or more recipients;
updating a message queue to include the generated message and an identification of the one or more recipients;
receiving, from the first client device running the desktop application and the first containerized application, a request for messages, the desktop application being configured to send the request for new messages based at lease in part on the first containerized application;
determining that the first client device is associated with a recipient of the one or more recipients; and
causing the generated message to be displayed, via the desktop application, on a display of the first client device.

13. The method of claim 12, further comprising
receiving, from a second client device, a second request for messages, the second client device running the desktop application and a second containerized application of the plurality of containerized applications;
determining that the second client device is associated with an additional recipient of the one or more recipients; and
causing the generated message to be displayed, via the desktop application, on a display of the second client device.

14. The method of claim 12, further comprising:
causing display of an administrator user interface on an administrator computing device, the administrator user interface facilitating user input of the generated message and the one or more recipients.

15. The method of claim 12, further comprising:
receiving information about an event; and
generating the generated message based at least in part on the event.

16. The method of claim 15, wherein:
generating the generated message comprises passing the information about the event through a machine learning model; and
the generated message is based at least in part on an output of the machine learning model.

17. The method of claim 16, wherein:
the event comprises at least one of:
- a threshold number of accesses to a contact center server;
- a threshold number of accesses to the contact center server in a geographic area; or
- a weather-related event; and the event is identified from one or more customer interactions comprising at least one of text-based or speech-based interactions.

18. One or more non-transitory computer-readable media storing instructions that, when executed by one or more processors, cause the one or more processors to perform actions comprising:
providing a first containerized application to a first client device, wherein the first containerized application is configured to execute interactive communication session on the first client device;
receiving information associated with a generated message for distribution to one or more recipients;
updating a message queue to include the generated message and an identification of the one or more recipients;
receiving, from the first client device running a desktop application and the first containerized application, a request for messages, the desktop application being configured to send the request for new messages based at least in part on the first containerized application,
determining that the first client device is associated with a recipient of the one or more recipients; and
causing the generated message to be displayed, via the desktop application, on a display of the first client device.

19. The one or more non-transitory computer-readable media of claim 18, wherein:
the desktop application runs on the first client device within a browser-based process; and
the first containerized application runs on the first client device within a non-browser process configured to access one or more native APIs of the first client device.

20. The one or more non-transitory computer-readable media of claim 18, wherein the request for new messages is transmitted automatically by the desktop application of the first client device, in response to at least one of:
an installation of the first containerized application on the first client device;
a beginning of a new interactive session by the first containerized application; or
an ending of an interactive session by the first containerized application.

* * * * *